No. 718,213. PATENTED JAN. 13, 1903.
W. NORRIS.
MOTOR VEHICLE.
APPLICATION FILED JULY 22, 1902.
NO MODEL. 2 SHEETS—SHEET 2.

WITNESSES:
Allan Foose
J. C. Delaney

INVENTOR
W. Norris
BY
Duell, Megrath & Anfield
ATTORNEYS.

THE NORRIS PETERS CO., PHOTO-LITHO., WASHINGTON, D. C.

UNITED STATES PATENT OFFICE.

WILLIAM NORRIS, OF PRESTON, ENGLAND, ASSIGNOR TO T. COULTHARD & COMPANY, LIMITED, OF PRESTON, ENGLAND.

MOTOR-VEHICLE.

SPECIFICATION forming part of Letters Patent No. 718,213, dated January 13, 1903.

Application filed July 22, 1902. Serial No. 116,517. (No model.)

*To all whom it may concern:*

Be it known that I, WILLIAM NORRIS, a subject of the King of Great Britain and Ireland, residing at Cooper road, Preston, England, have invented certain new and useful Improvements in Connection with Motor-Propelled Road-Vehicles, of which the following is a specification.

This invention relates to improvements in the arrangement and construction of vehicles for use upon common roads and in which steam is employed as the motive power, the object of the invention being to form such a combination and arrangement of parts upon the vehicle as will obviate the risk of injury to which ordinarily-arranged vehicles are subjected, and to so dispose the parts that the driver can have an uninterrupted view in front while having the controlling members and levers connected with the mechanism arranged conveniently for manipulation when in such position.

Figure 1:
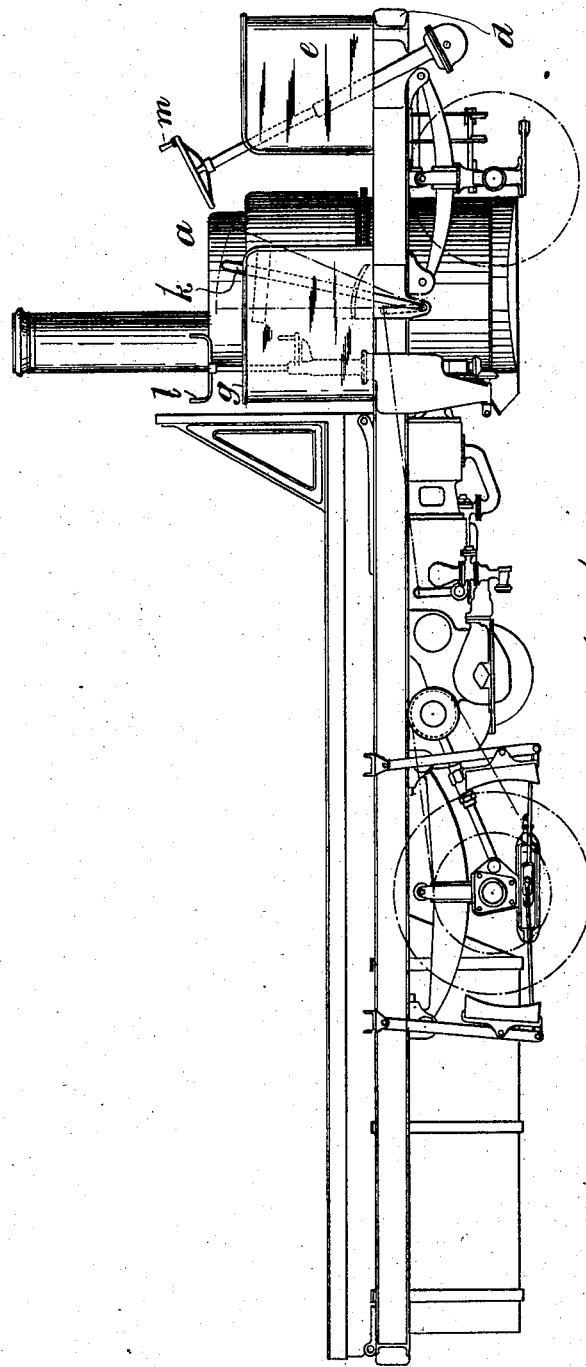
Figure 2:
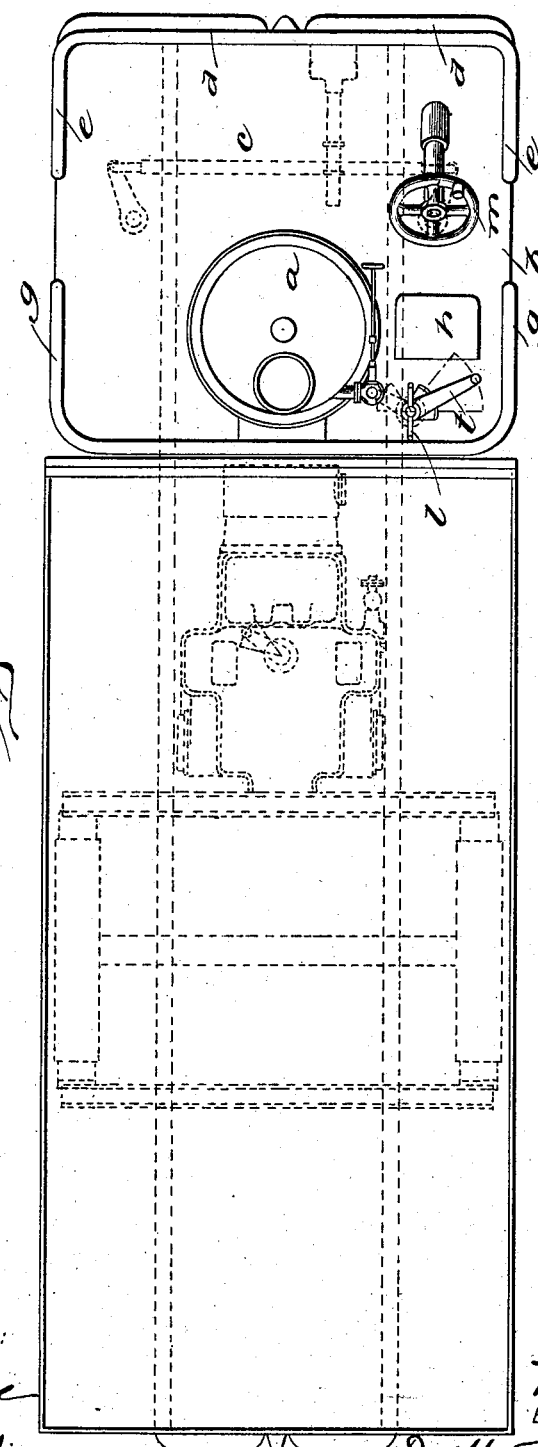

In the accompanying sheets of illustrative drawings, Figure 1 is a side elevation of one form of my vehicle, and Fig. 2 is a plan of the same.

In carrying my invention into effect I mount the boiler *a* in a position upon the fore part of the underframe or carriage *b* such that there is a space *c* immediately in front of the same and between it and the buffer-beam *d* of the vehicle. I form my bunker or coal-storage space at the extreme end of the vehicle *c*, inclosing such space with a guard-frame *e* for the purpose of insuring that the particular member upon the carriage adjacent to the extreme end of the frame shall be that which can receive no injury such as would impair the working of the vehicle in the event of a collision or violent contact being made against the buffer-blocks *d*.

I mount my boiler *a* preferably in the portion of the fore carriage or under frame, and I protect it and inclose it by means of a guard-frame *g*, forming at one side of the space a seat *h* for the driver and at the other side utilizing the space for the mounting of a pump, tool-box, or other requisites that may be necessary for the working of the car.

I dispose the steam-controlling levers, brake-levers, and steering-wheel *k l m* conveniently to the seat *h* of the driver, so that they may all be actuated from the one side of the vehicle. I mount beneath the underframe of the vehicle the engines or motors, together with the driving-gear, and I secure to the underframes the ordinary spring and axle-boxes and swiveling and turning mechanism for receiving the ordinary traveling wheels, and I arrange a water-tank in a convenient position beneath the underframe to suit the particular purpose for which the vehicle is to be constructed.

I modify the form of the platform or table like surface of the lorry portion of my vehicle to suit the purposes for which the vehicle is intended and to goods to be carried thereon.

By this my improved combination and arrangement of parts I am enabled to place the boiler in the least dangerous position upon the vehicle and to put in the space ordinarily occupied by the boiler at the front of the vehicle the coal or fuel bunkers, which would serve to intercept the thrust between the front portion of the vehicle and the boiler, taking care, however, to provide sufficient space between the bunkers and the boiler to enable the driver to pass between the same from one side of the foot-plate to the other.

The advantage of this combination is such that the driver has a complete uninterrupted view, and the boiler is secured in a position where it is the least likely to be jeopardized by violent contact or rough usage to which the vehicle might be subjected.

I tie the sides of the axle-boxes to the underframes by means of rods, so as to prevent a strong impact from the side from causing damage to the suspension-springs and to prevent the heavy strains that would be induced by a blow given to the vehicle by running against a curb or the like.

Having now described my invention, what I claim as new, and desire to secure by Letters Patent, is—

In a steam-propelled road-vehicle, a front platform of the vehicle, a boiler carried thereon, a fuel-bunker immediately in front of the boiler adapted to form a buffer in case of a collision, and a driver's seat, steering-wheel, and controlling-lever at one side of the boiler, substantially as and for the purpose set forth.

In witness whereof I have hereunto set my hand in presence of two witnesses.

WILLIAM NORRIS.

Witnesses:
JOHN BLACK,
G. W. LWESEY.